Patented May 5, 1953

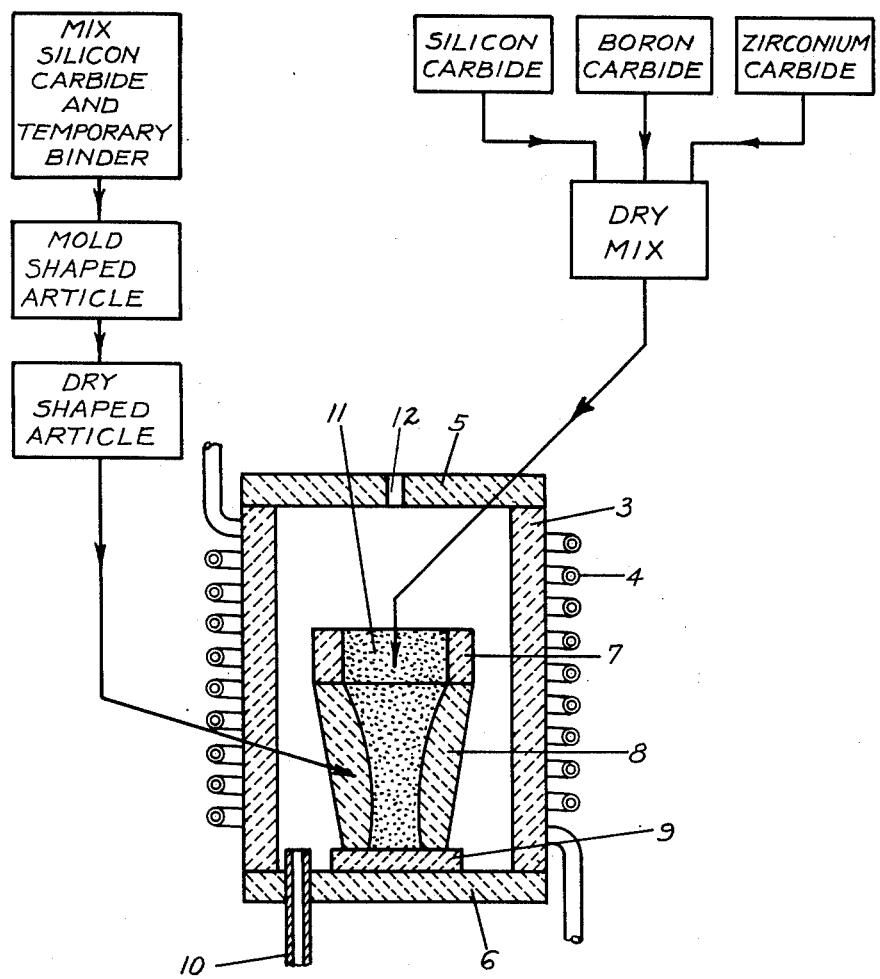

2,637,091

UNITED STATES PATENT OFFICE 2,637,091

BONDED SILICON CARBIDE ARTICLES AND METHOD OF MAKING SAME

Kenneth C. Nicholson, Niagara Falls, N. Y., assignor to The Carborundum Company, Niagara Falls, N. Y., a corporation of Delaware Application March 26, 1949, Serial No. 83,767

12 Claims. (Cl. 25—157)

This invention relates to bonded silicon carbide articles and to methods of making the same.

Silicon carbide is generally reserved for the making of refractories which are to be used under severe operating conditions where the temperature is extremely high, the fluctuations in temperature are abnormally great, the requirements of mechanical strength at elevated temperatures are excessive, and/or the corrosive and erosive conditions of use are severe in one or more respects. The high thermal conductivity of silicon carbide also makes it an ideal material for certain applications, as, for example, where rapid heat transfer is desired. The superiority of bonded silicon carbide refractories over the more inexpensive fire clay products has justified the added cost of using silicon carbide products in many cases. Considerable attention has been paid therefore to ways of taking the best possible advantage of the extremely refractory properties and qualities of the silicon carbide by the use therewith of bonding materials which are themselves of sufficient refractoriness that they do not materially detract from the satisfactoriness of the silicon carbide material. In spite of the extensive activity in this direction the full benefits to be derived from the highly refractory, resistant character of the silicon carbide itself have never been realized.

Heretofore efforts to produce a bond for silicon carbide particles which would have an extremely high strength at elevated temperatures and would be resistant to substantial fluctuations in temperature and at the same time would be satisfactorily resistant to oxidation have been only partially successful. Clays and other ingredients producing bonds of the porcelain type have resulted in bodies which have had good hot strength, but which are not sufficiently oxidation resistant to give a satisfactory life. Other silicon carbide bodies using bonds of a glassy nature have been fairly resistant to oxidation, only to fail at operating temperatures because of softening of the glass bond and loss of strength. Attempts to improve the properties of such articles by the application of various glazes to the formed article or by the incorporation of glaze-developing materials within the body of the article as a component of the bonding material have not been entirely successful, sometimes because of the temporary character of the glaze and in other instances because of the tendency of the glaze to cause staining or discoloration of articles coming in contact with the refractory during use at high temperatures. Such disadvantages have greatly limited the range or field of use in which bonded silicon carbide refractories have been capable of application.

A high resistance to spalling as well as a fairly high strength at elevated temperatures has led also to the use of coke residue bonds in spite of the fact that such bonds are even more susceptible to rapid oxidation and destruction than in silicon carbide. Regardless of the type of bond heretofore used each one has had some specific disadvantage to limit its field of application or appreciably shorten its useful life.

Moreover, even silicon carbide itself is subject to some degree of oxidation under extremely severe oxidizing conditions with the formation of silica. The formation of any substantial amount of silica within a silicon carbide article tends to increase the rate of destruction of the body since the conversion of silicon carbide to silica produces a material of 50% greater molecular weight but of lower specific gravity, thereby forcing the article to "grow" or distend out of shape, leading to an early breakdown of the article. It is known that molded articles are of necessity more or less porous so that oxidizing gases and vapors have access to the interior of the customary bonded article. In an effort to eliminate or reduce the size and/or number of pores of silicon carbide molded articles attempts have been made to reduce the porosity by molding at greater pressures and by using mixtures of silicon carbide grains which produce molded shapes of maximum density. Also, various materials have been used to impregnate the molded and fired silicon carbide articles to close off the pores to the entry of erosive or corrosive oxidizing gases in use, such as loading of the article with silicon and other materials. However, the materials which have been used for impregnating purposes have themselves been substantially less refractory than the silicon carbide or have been subject to oxidation to end-products of low-resistance.

It is an object of the present invention to provide novel bonded silicon carbide articles in which the bonding material is also highly refractory and resistant to oxidation.

It is a further object to provide a method of making silicon carbide shapes of high density and resistance to oxidation.

It is a still further object to provide a bonded silicon carbide article which avoids many of the disadvantages of the bonded silicon carbide articles of the prior art.

In accordance with the present invention I have found that dense, bonded silicon carbide bodies or shapes can be obtained by first forming the desired shape of granular silicon carbide and impregnating the formed article, preferably, although not necessarily, at the time that it is fired, with a fusible mixture of zirconium carbide and other refractory carbides such as, for example, a fusion of zirconium carbide with boron carbide and silicon carbide, or a fusion of zirconium carbide and boron carbide. A typical fusion of carbides found satisfactory for impregnating molded or otherwise formed articles of silicon carbide is one consisting of 35% by weight of silicon carbide, 20% by weight zirconium carbide and 45% by weight boron carbide. Instead of using a direct mixture of the carbides as the impregnating material it is possible to use a mixture of ingredients such as the oxides of the desired metals, or the elemental metals, which upon heating to the required temperature of impregnation react and fuse together to provide the desired carbide fusion. For example, when a mixture of silicon carbide, boron carbide, zirconium oxide and elemental carbon is fused together the zirconium oxide and carbon react to form zirconium carbide which then fuses with the other carbides to provide a suitable impregnating material. Also, commercial boron carbide, which contains substantial amounts of free carbon can be used in mixtures containing oxides to provide the carbon required to reduce the oxides and/or metals of the mixture to carbides.

In forming the silicon carbide shape the particles of silicon carbide are usually selected so as to provide an article of maximum molded density. It is also customary to use a small amount of a temporary binder to provide adequate green strength in the molded article. The molded or otherwise formed article of silicon carbide is dried and then placed in a suitable heating chamber together with a mixture of zirconium carbide and the other carbide or carbides which constitute the impregnating mixture and the temperature of the heating chamber raised to a point where the impregnating mixture fuses and flows into the pores of the formed silicon carbide article after which the heating chamber is cooled and the article removed. During the impregnating step the atmosphere of the heating chamber should be non-oxidizing and conditions should be such that nitrides are not formed. An inert atmosphere of helium has been found satisfactory for the purpose and is usually maintained throughout the cooling down stage as well as through the heating up and impregnating stage. The finished article retains its originally molded size and shape and is found to be dense and uniformly impregnated throughout with a fusion of the carbide or carbide-forming materials placed in the heating chamber with the formed article.

When the impregnation has been properly accomplished according to the teachings of this invention the residue left from the impregnating mixture, after heating to impregnate a silicon carbide article, is left in a rather loose, granular condition. It will not be fused to the article and it will be in a condition to be easily removed from the impregnated article, leaving the surfaces of the article in essentially as smooth condition as the unfired article.

A description of the procedure which I have followed in making an exhaust nozzle of the type which is required to withstand extremely high temperatures and high velocity hot gases and combustion products will illustrate the manner of attaining the objects of the present invention.

The figure of the drawing depicts graphically in the form of a flow sheet the sequence of steps followed in carrying out the process, and also shows diagrammatically in connection therewith a vertical sectional view of the furnace chamber in which the firing and impregnation is conducted. Reference to the various parts of the furnace chamber shown in the drawing will be made during the course of the following illustrative description of the process.

The following mixture is pressed in a steel mold at 50,000 to 100,000 pounds per square inch pressure on the material in the mold to form a small, slightly tapered nozzle $1\frac{11}{16}$ inches in diameter at the large end and 1¼ inches in length having a minimum wall thickness of $\frac{3}{16}$ inch, with the bore tapered inwardly from both ends to provide a constricted throat area a short distance in from one end of the nozzle.

| | Parts by weight |
|---|---|
| 14–36 grit size silicon carbide | 66⅔ |
| 40–70 grit size silicon carbide | 20 |
| 80 grit size and finer silicon carbide | 13⅓ |
| Dry lignone | 5 |
| Bentonite gel (1 part bentonite to 4 parts water) | 6 |

The pressed nozzle 8 is dried at 250° F. for several hours, after which it is placed in a graphite lined chamber 3 of a high frequency electric furnace of which the coil 4 is diagrammatically shown and supported on a bottom plate 9 pressed from the same mixture from which the nozzle was pressed, which plate sets on the floor 6 of the furnace. A tube 7 of the same composition and having the same diameter as the diameter of the nozzle being made is placed on top of the molded nozzle to serve as a container for the granular mixture 11 of impregnating carbides. 40 grams of the following mixture is then placed in the tube which has been placed on top of the nozzle:

| | Parts by weight |
|---|---|
| 60 grit size and finer silicon carbide | 35 |
| 100 grit size and finer zirconium carbide | 20 |
| 100 grit size boron carbide | 45 |

The silicon carbide nozzle 8 to be impregnated, along with the container 7 filled with the granular impregnating mixture resting on top of the nozzle, is then heated to a temperature of about 2300° C. as determined by an optical pyrometer sighted on the nozzle being impregnated. The sighting is done through a small hole 12 in the top graphite cover plate 5 of the furnace. While I have stated the temperature to be about 2300° C., the exact temperature may vary somewhat from this figure due to the difficulty in measuring the temperatures of the nozzle with an optical pyrometer. Fumes and colored flames issuing from the sighting hole make it difficult to obtain exact temperature readings. The correct temperature to which the article being impregnated should be heated can be said to be a temperature high enough to cause the granular impregnating mixture of silicon carbide, boron carbide and zirconium carbide to melt and enter the pores of the shaped silicon carbide nozzle while the temperature should not be high enough to cause decomposition of the silicon carbide itself to any appreciable extent.

It is also essential that the atmosphere within the furnace chamber be one in which the carbides do not oxidize, and conditions should also be such as to prevent the formation of nitrides. One way in which I accomplish this is by the use of an inert atmosphere such as pure, dry helium gas which is fed into the furnace chamber by means of a graphite tube 10; a continuous stream of the helium gas being maintained during the heating and also during the cooling period. However, I have found that as long as the atmosphere is non-oxidizing, nitrogen-containing atmospheres may be employed without the formation of nitrides providing the impregnating mixture of carbides contains sufficient free carbon, 5% of free carbon being enough to accomplish that purpose. However, it is desirable for best results to avoid direct contact of the article to be impregnated with any free carbon or graphite at the time the article is being heated to the impregnating temperature of around 2300° C.

Although the resulting impregnated article retains its originally molded shape and size, it undergoes a substantial gain in weight due to the absorption of the impregnating carbide fusion material. The finished, impregnated nozzle has a porosity of only 1.81%, a water absorption of 0.59% and an apparent density of 3.30 grams per cubic centimeter. The following are illustrative of the weights before and after impregnating of a small nozzle as described above.

|  | Grams |
|---|---|
| Weight of pressed silicon carbide nozzle after heating with the impregnating mixture | 83.38 |
| Weight of same nozzle before heating | 70.50 |
| Gain in weight | 12.88 |

The following are two typical chemical analyses of silicon carbide nozzles made in accordance with the present invention as described above:

|  | I | II |
|---|---|---|
|  | Percent | Percent |
| Silicon | 60.46 | 59.7 |
| Carbon | 27.64 | 27.56 |
| Boron | 7.02 | 6.63 |
| Zirconium | 3.26 | 3.62 |
| Undetermined | 1.62 | 2.49 |
| Total | 100.00 | 100.00 |

Assuming that all the silicon is present as silicon carbide, the zirconium as zirconium carbide and the boron as boron carbide, the calculated compositions of the impregnated nozzles based upon the chemical analyses given above are approximately as follows:

|  | I | II |
|---|---|---|
|  | Percent | Percent |
| Silicon carbide (SiC) | 86.36 | 85.3 |
| Boron carbide (B₄C) | 9.24 | 8.47 |
| Zirconium carbide (ZrC) | 3.69 | 4.10 |

As I have already indicated, it is not necessary that the initial components of the impregnating mixture be carbides. The ingredients of the impregnating mixture may be at least in part selected from such carbide-forming substances that the mixture of materials upon heating to the impregnating temperature fuses together and reacts to produce the carbide fusion material with which it is sought to fill the silicon carbide body. For example, instead of the impregnating mixture of carbides set forth in the example given above, the following mixtures can be similarly used to impregnate the silicon carbide shape with comparable results. The steps of the impregnating process are the same as those given hereinabove when an initial mixture of carbides is used.

|  | Parts by weight |
|---|---|
| 60 grit size and finer silicon carbide | 35 |
| 100 grit size boron carbide | 45 |
| 100 grit size and finer zirconium oxide | 24 |
| 100 grit size and finer carbon | 8 |

The composition of a silicon carbide nozzle impregnated with the above fusion material as calculated from a typical chemical analysis of an impregnated silicon carbide body is as follows:

|  | Per cent |
|---|---|
| Silicon carbide (SiC) | 92.64 |
| Boron carbide (B₄C) | 4.49 |
| Zirconium carbide (ZrC) | 2.87 |

Another impregnating mixture found suitable for practicing the present invention, and which is used in the same manner as the other impregnating mixtures herein set forth is as follows:

|  | Parts by weight |
|---|---|
| 200 grit size and finer silicon metal | 24 |
| 100 grit size and finer commercial boron carbide containing approximately 18% of free carbon | 44 |
| 100 grit size and finer zirconium oxide | 23 |
| 100 grit size and finer carbon | 9 |

It has been my experience that fusions of zirconium carbide with other carbides, such as boron carbide and silicon carbide, show a marked tendency to wet the silicon carbide at temperatures in the neighborhood of 2300° C. so that as a result an article in the vicinity of such a carbide fusion at that temperature tends to be uniformly impregnated throughout by reason of the capillary action of the porous body upon the molten fusion material. The use of zirconum carbide as an essential component of the impregnating mixture has additional advantages over and above its ability in fusion with other carbides to readily wet, and consequently penetrate, molded silicon carbide shapes. Zirconium carbide has a melting point of 3532° C. and zirconium oxide has a melting point variously given as from 2400° C. to 3000° C. Therefore, in the event that a silicon carbide shape impregnated with a carbide fusion containing zirconium carbide is subjected to conditions under which oxidation does take place any zirconium oxide formed by oxidation of the zirconium carbide component yields a material almost as refractory as the original carbide. On the other hand, by comparison were boron carbide alone to be used, while the boron carbide itself is adequately refractory it is highly subject to oxidation to boric oxide which has a melting point of around 577° C. and is therefore entirely unsuited as a refractory material. It appears, furthermore, that the zirconium carbide, which upon oxidation yields an oxide of almost equivalent refractoriness, also by its presence tends to protect or in some other manner not as yet fully explained, to inhibit or at least retard the oxidation or breakdown of the other constituents of the impregnating mixture. It is therefore essential to the provision of a satisfactorily oxidation-resistant refractory bond in accordance with the present invention that zirconium carbide constitute a substantial proportion of the carbide composition used for impregnating. As a result, articles made in accordance with the present invention are constituted substantially entirely of material of extremely high refractoriness and resistance to oxidation.

It is to be understood that the products of the present invention in its various modifications are not limited to any specific field or fields of use such as might be defined by the specific example previously set forth. The products can be made in any desired shape as well as provided in granular or aggregate form. They are, therefore, not only suited for many of the uses for which industrial refractories are required, including bricks, blocks, setter tile, muffles, kiln furniture, and special shapes for application in and around furnaces and other high temperature equipment, but they are also well suited for many specialty high temperature applications, such as jet engine combustion chambers, linings for exhaust nozzles, rocket combustion chambers and exhaust nozzles, turbine blades, stator blades, lens fusion blocks, and the like. They are also suitable for the fabrication of laboratory ware, including combustion boats, muffles, crucibles, burner holders and other shapes.

The resistance of such bodies to chemical attack makes them highly suitable for the making of articles used in the containing, conveying and handling of many acids, alkalies and other corrosive chemicals, including such articles as chambers and chamber linings, crucibles, pipes and pipe fittings, and other sundry shapes.

Materials and articles of the present invention also can be made for abrasive purposes, such as grinding wheels, sharpening stones, razor hones, and other grinding and polishing shapes and materials. The electrical properties make the present bodies useful in many articles in the electrical and radio industry including resistors and grid leaks. Other miscellaneous uses include its use as thread guides, wire drawing dies, blasting nozzles, heating elements, wear plates, gauges and the like.

Having thus described the invention, it is desired to claim:

1. A refractory body of silicon carbide, the pores thereof being filled with a fusion of silicon carbide, zirconium carbide and boron carbide.

2. A shaped refractory article composed of granular silicon carbide and containing interstitially of the granular silicon carbide a fused material comprising silicon carbide, zirconium carbide, and boron carbide.

3. A refractory body composed of granular silicon carbide and an interstitial fused mass containing zirconium carbide and boron carbide, said refractory body analyzing approximately 86% by weight silicon carbide, approximately 9% by weight boron carbide, and approximately 4% by weight zirconium carbide.

4. A dense carbide body composed predominantly of granular silicon carbide and containing in addition thereto boron carbide and zirconium carbide interstitial to the granular silicon carbide.

5. A dense refractory shape composed of silicon carbide particles and an interstitial mass, said interstitial mass consisting essentially of 35% by weight silicon carbide, 20% by weight zirconium carbide and 45% by weight boron carbide.

6. A refractory body of granular silicon carbide and containing interstitially of the granular silicon carbide a fusion of carbides containing zirconium carbide and boron carbide.

7. The method of making a bonded silicon carbide refractory article which comprises forming an article of the desired shape from a mixture comprising granular silicon carbide and a small amount of a temporary binder, drying said shaped article, and firing said article in an inert atmosphere to a temperature above 2000° C. while the article is in contact with a mixture of zirconium carbide, silicon carbide and boron carbide.

8. The method of making a bonded silicon carbide refractory article which comprises forming an article of the desired shape from a mixture comprising granular silicon carbide and a small amount of a temporary binder, drying said shaped article, placing said article in a heating chamber together with a mixture of zirconium carbide, boron carbide and silicon carbide, and heating said article and carbide mixture in an inert atmosphere to a temperature at which the carbide mixture fuses and impregnates the pores of said shaped silicon carbide article.

9. The method of making a bonded silicon carbide refractory article which comprises forming an article of the desired shape from a mixture comprising granular silicon carbide and a small amount of a temporary binder, drying said shaped article, placing said article in a heating chamber together with a mixture of zirconium carbide, boron carbide and silicon carbide, and heating said article and carbide mixture in a non-oxidizing atmosphere to a temperature at which the carbide mixture fuses and impregnates the pores of said shaped silicon carbide article.

10. The method of making a bonded silicon carbide refractory article which comprises forming an article of the desired shape from a mixture comprising granular silicon carbide and a small amount of a temporary binder, drying said shaped article, placing said article in a heating chamber together with a mixture of zirconium carbide, boron carbide and silicon carbide, and heating said article and carbide mixture in an atmosphere of helium to a temperature at which the carbide mixture fuses and impregnates the pores of said shaped silicon carbide article.

11. The method of making a bonded silicon carbide refractory article which comprises forming an article of the desired shape from a mixture comprising granular silicon carbide and a small amount of a temporary binder, drying said shaped article, placing said article in a heating chamber together with a mixture of zirconium carbide, boron carbide and silicon carbide in the proportions of 35% by weight of silicon carbide, 20% by weight zirconium carbide and 45% by weight boron carbide, and heating said article and carbide mixture in a non-oxidizing atmosphere to a temperature at which the carbide mixture fuses and impregnates the pores of said shaped silicon carbide article.

12. The method of making a bonded silicon carbide refractory article which comprises forming an article of the desired shape from a mixture comprising granular silicon carbide and a small amount of a temporary binder, drying said shaped article, placing said article in a heating chamber together with a mixture of carbides containing both zirconium carbide and boron carbide in substantial amounts, and heating said article and carbide mixture in an inert atmosphere to a temperature at which the carbide mixture fuses and impregnates the pores of said shaped silicon carbide article.

KENNETH C. NICHOLSON.

References Cited in the file of this patent

FOREIGN PATENTS

| Number | Country | Date |
|---|---|---|
| 478,016 | Great Britain | Jan. 11, 1938 |